(12) United States Patent
Phillips et al.

(10) Patent No.: US 12,067,509 B2
(45) Date of Patent: Aug. 20, 2024

(54) DETERMINING A FULFILLMENT LOCATION FOR AN EXPEDITED PACKAGE REQUEST

(71) Applicant: Capital One Services, LLC, McLean, VA (US)

(72) Inventors: Jeremy Phillips, Brooklyn, NY (US); James Newton, Glen Allen, VA (US); Justin Crist Lee, Dove Canyon, CA (US)

(73) Assignee: Capital One Services, LLC, McLean, VA (US)

( * ) Notice: Subject to any disclaimer, the term of this patent is extended or adjusted under 35 U.S.C. 154(b) by 751 days.

(21) Appl. No.: 16/901,461

(22) Filed: Jun. 15, 2020

(65) Prior Publication Data

US 2021/0390502 A1 Dec. 16, 2021

(51) Int. Cl.
| | | |
|---|---|---|
| *G06Q 10/06* | (2023.01) | |
| *G06F 16/29* | (2019.01) | |
| *G06F 18/22* | (2023.01) | |
| *G06N 20/00* | (2019.01) | |
| *G06Q 10/0631* | (2023.01) | |
| *G06Q 10/0833* | (2023.01) | |
| *G06Q 40/02* | (2023.01) | |

(52) U.S. Cl.
CPC ......... *G06Q 10/0631* (2013.01); *G06F 16/29* (2019.01); *G06F 18/22* (2023.01); *G06N 20/00* (2019.01); *G06Q 10/0833* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 11,162,800 B1* | 11/2021 | Carbery | ................. G01C 21/28 |
| 2007/0066358 A1 | 3/2007 | Silverbrook et al. | |
| 2012/0047075 A1* | 2/2012 | Balistierri | .......... G06Q 20/3829 |
| | | | 705/35 |
| 2018/0107977 A1 | 4/2018 | McHale et al. | |
| 2020/0051016 A1* | 2/2020 | Briggs | ............... G06Q 10/0835 |
| 2020/0279339 A1* | 9/2020 | Akutagawa | ........ G06Q 10/1095 |
| 2021/0027241 A1* | 1/2021 | Burke | ................ G06Q 10/0835 |

FOREIGN PATENT DOCUMENTS

| | | |
|---|---|---|
| WO | 2013039573 A2 | 3/2013 |
| WO | 2014102797 A1 | 7/2014 |

* cited by examiner

*Primary Examiner* — Alan Torrico-Lopez
(74) *Attorney, Agent, or Firm* — KDW FIRM PLLC (57) ABSTRACT

Various embodiments are generally directed to techniques to facilitating delivery of a package or sensitive item to a user, where the package or sensitive item can be a credit card or debit card. Various techniques, methods, systems, and apparatuses include utilizing one or more factors for determining an optimal delivery location or path in relation to the user obtaining the sensitive package or item. Various embodiments can provide the user or the delivery courier with an interface that maps or otherwise indicates, by a color-scheme or other suitable scheme, one or more of demand and availability of the sensitive item or package in relation to a receiving or delivery location, where in various embodiments, the mapping or scheme associated with demand and availability can be based in whole or in part on the one or more factors associated with optimal delivery.

20 Claims, 6 Drawing Sheets

```
START
  │
  ▼
RECEIVING A REQUEST FROM A USER FOR DELIVERY OF A FINANCIAL SERVICES
PRODUCT;
205
  │
  ▼
DETERMINING AN OPTIMAL DELIVERY SOURCE LOCATION FOR A FINANCIAL
SERVICES PRODUCT FROM A PLURALITY OF DELIVERY SOURCE LOCATIONS BASED
ON ONE OR MORE DELIVERY-OPTIMIZATION FACTORS
210
  │
  ▼
DELIVERING THE FINANCIAL SERVICES PRODUCT TO THE USER BASED ON THE
DETERMINATION OF THE OPTIMAL DELIVERY SOURCE LOCATION.
215
  │
  ▼
RECEIVING A FIRST PLURALITY OF LOCATION DATA RELATED TO THE DETECTABLE
STREET TRAFFIC FROM A PLURALITY OF VENDORS EACH ASSOCIATED WITH A
LOCATION WITHIN A CERTAIN PROXIMITY THRESHOLD TO AT LEAST ONE OF THE
PLURALITY OF DELIVERY SOURCE LOCATIONS
220
  │
  ▼
DELIVERING A SECOND PLURALITY OF LOCATION DATA RELATED TO THE
DETECTABLE STREET TRAFFIC TO EACH OF THE PLURALITY OF VENDORS FROM THE
AT LEAST ONE OF THE PLURALITY OF DELIVERY SOURCE LOCATIONS
225
  │
  ▼
SUGGESTING A RESOURCING ACTION TO EACH OF THE PLURALITY OF VENDORS
BASED ON THE DELIVERED LOCATION DATA
230
  │
  ▼
END
```

```
START
  │
  ▼
```

RECEIVING A REQUEST FROM A USER FOR DELIVERY OF A FINANCIAL SERVICES PRODUCT
305

DETERMINING AN OPTIMAL DELIVERY SOURCE LOCATION FOR A FINANCIAL SERVICES PRODUCT FROM A PLURALITY OF DELIVERY SOURCE LOCATIONS BASED ON ONE OR MORE DELIVERY-OPTIMIZATION FACTORS
310

DELIVERING THE FINANCIAL SERVICES PRODUCT TO THE USER BASED ON THE DETERMINATION OF THE OPTIMAL DELIVERY SOURCE LOCATION
315

GENERATING A COLOR-MAP DISPLAYING A DEMAND FOR AT LEAST ONE FINANCIAL SERVICES PRODUCT TYPE, CORRESPONDING TO THE FINANCIAL SERVICES PRODUCT REQUESTED BY THE USER, AT EACH OF THE PLURALITY OF DELIVERY SOURCES, AND WHEREIN THE BASIS FOR DETERMINING THE OPTIMAL DELIVERY SOURCE IS FURTHER BASED ON THE GENERATED COLOR-MAP
320

END

FIG. 3

MACHINE LEARNING SYSTEM 406

DETERMINING A FULFILLMENT LOCATION FOR AN EXPEDITED PACKAGE REQUEST

BACKGROUND

The present embodiments relate to machine learning, and more particularly machine learning to facilitate delivery of a package or sensitive item Electronic requests, for information or otherwise, made by users for products and services are prevalent in the current marketplace, but current services for making such requests, including search engines, suffer in the quality and security of delivering products, including inflicting unnecessary delays on users and/or exposing users to security risks. Accordingly, there is a need to improve the delivery of packages and/or sensitive items.

SUMMARY

One aspect of the present disclosure includes a compute implemented method for facilitating delivery of a sensitive item or package, such as a financial services product, to a user. The method can include: receiving a request from a user for delivery of the sensitive item or package (e.g. financial services product), determining an optimal delivery source location for the sensitive item or package (e.g. financial services product) from a plurality of delivery source locations based on i) a threshold score for each of the plurality of delivery source locations, wherein the threshold score is related to a security compliance measure associated with the sensitive item or package (e.g. financial services product) and ii) at least one of a) a distance of each of the plurality of delivery source locations to the user, b) a plurality of detectable internet connections associated with a plurality of internal customers at each of the delivery source locations, c) a detectable data bandwidth associated with a plurality of enterprise internet connections at each of the plurality of delivery source locations, d) one or more data sources indicative of an amount of consumption of one or more utility types by each of the delivery source locations, e) a plurality of staff transactions at each of the delivery source locations, and f) a detectable street traffic associated with a plurality of external customers entering each of the plurality of delivery source locations, and delivering the sensitive item or package (e.g. financial services product) to the user based on the determination of the optimal delivery source location.

Another aspect of the present disclosure includes an apparatus configured to facilitate delivery of a sensitive item or package, such as a financial services product, to a user. The apparatus can include: a memory to store instructions, and processing circuitry, coupled with the memory, operable to execute the instructions, that when executed, cause the processing circuitry to: receive a request from a user for obtaining the sensitive item or package, determine an optimal delivery source location for the sensitive item or package from a plurality of delivery source locations based on a color-map displaying a demand for at least one sensitive item or package type (e.g. a financial services product type) in relation to a supply of that least one sensitive item or package type (e.g. a financial services product type), the sensitive items or package type (e.g. financial services product type) corresponding to the sensitive item or package (e.g. financial services product) requested by the user, at each of the plurality of delivery sources and at least one of a) a distance of each of the plurality of delivery source locations to the user, b) a plurality of detectable internet connections associated with a plurality of internal customers at each of the delivery source locations, c) a detectable data bandwidth associated with a plurality of enterprise internet connections at each of the plurality of delivery source locations, d) one or more data sources indicative of an amount of consumption of one or more utility types by each of the delivery source locations, e) a plurality of staff transactions at each of the delivery source locations, and f) a detectable street traffic associated with a plurality of external customers entering each of the plurality of delivery source locations, and instruct the user that the sensitive package or item (e.g. financial services product) is available at the optimal delivery source location.

Yet another aspect of the present disclosure includes a non-transitory computer-readable storage medium storing computer-readable program code executable by a processor to generate machine learning model useful for facilitating delivery of a sensitive item or package to a user, including a financial services product. The computer-readable program code executable by a processors including the ability to generate a machine learning model for determining an optimal delivery source location for a sensitive item or package type (e.g. a financial services product type) based on two or more of: i) a threshold score for each of a plurality of delivery source locations, wherein the threshold score is related to a security compliance measure associated with the sensitive item or package type (e.g. a financial services product type), ii) a plurality of detectable internet connections associated with a plurality of internal customers at each of the delivery source locations, iii) a detectable data bandwidth associated with a plurality of enterprise internet connections at each of the plurality of delivery source locations, iv) one or more data sources indicative of an amount of consumption of one or more utility types by each of the delivery source locations, v) a plurality of staff transactions at each of the delivery source locations, and vi) a detectable street traffic associated with a plurality of external customers entering each of the plurality of delivery source locations.

BRIEF DESCRIPTION OF THE DRAWINGS

FIG. 3 illustrates examples of one or more processing flows for determining an optimal provision of a sensitive item or package to one or more users and in accordance at least one embodiment of the present disclosure.

DETAILED DESCRIPTION

Various embodiments are generally directed to techniques, systems, and processing flows to improve the delivery or reception of sensitive items, packages, or products, such as financial services products (e.g. credits cards and/or debit cards), to one or more users. Traditional delivery methods, such as mail, suffer from inefficiency in terms of the amount of time it can take to deliver or facilitate (e.g. the time associated with traditional mail) of the sensitive items or packages, in addition to exposing the sensitive items, packages, or products to security vulnerabilities, such as the mail being intercepted by a malicious third party (e.g. a thief can remove a mailed sensitive item, package, or from a mailbox and appropriate it). Various embodiments of the present disclosure optimize the delivery of sensitive items, packages, or products by determining a real-time optimal delivery route, delivery source and/or reception location by considering one or more factors related to the delivery location, the source location, the nature of the product, the resources available to facilitate the request (e.g. human, computer, transportation, etc.), the type of security or handling appropriate for the type of sensitive item, package, or product, and other factors. A machine learning algorithm can be generated using the one or more factors such that multiple requests can be handled real-time and automatically, which can enhance both security and speed of delivery or receipt of the sensitive item, package, or product.

In various embodiments, the system associated with the optimization of delivery or receipt of the sensitive item, package or product can generate a graphical user interface on any suitable computer device, e.g. lab-top, cell phone, computer, etc. that maps according to a color-scheme the optimization associated with delivery or receipt of the sensitive item, package, or product. Specifically, in various embodiments, the graphical user interface can provide a color-scheme based on one or more of a demand for a particular sensitive item, package, or product type, a supply of the particular sensitive item, package or product type and/or one or more of the factors associated with developing the optimization of the delivery or receipt. In various embodiments, the generated graphical user interface can increase the efficiency and security of either a courier delivering a sensitive item, package, or product, e.g. a financial services product such as a credit card or debit card, and/or provide the most suitable pick-up location for a user to pick up the sensitive item, package, or product, e.g. a financial services product such as a credit card or debit card.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

Figure 1:
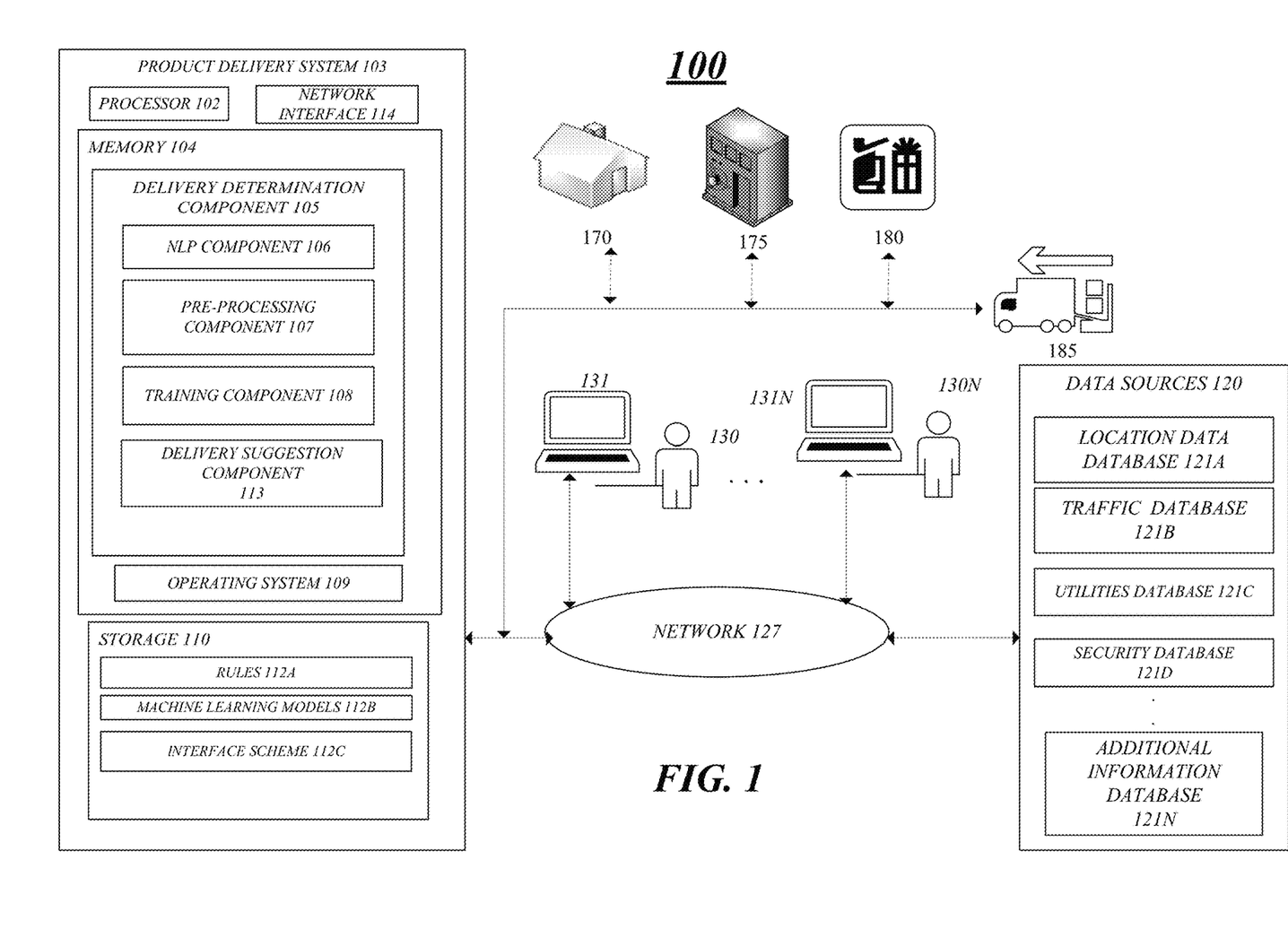
FIG. 1 illustrates an example of a system for determining an optimal provision of a sensitive item or package for one or more users in accordance with at least one embodiment of the present disclosure.

FIG. 1 illustrates an example of a product delivery system 100 that can facilitate proper delivery or receipt of a sensitive item, package, or product, e.g. a financial services product such as a credit card or debit card. The product delivery system 100 can also provide a single-entry point to enter the entirety of a user-request or courier-request to deliver or otherwise facilitate receipt of the sensitive item, package or product to the user. In various embodiments, the system 100 can provide a graphical-user interface (GUI) that can provide a color-scheme for the user or courier to use in obtaining, receiving, and/or delivering the sensitive item, package or product. The "units" or "components" described in the system, whether contained in memory or otherwise employed therein, can be any suitable software, logic (hardware or software), or hardware element specifically configured to perform or be used in the performance of one or more tasks or functions as discussed herein.

In one or more embodiments, the product delivery system 100 can include a product delivery computing system 103, which in turn includes one or more processors 102, memory 104, storage 110 and a network interface 114. The one or more processors 102 can be any suitable software or hardware computer components for carrying out any operation as discussed herein. The memory 104 can be any suitable component or unit for storing protocols, information, algorithms, and/or instructions for execution by the one or more processors, e.g., the memory 104 may be any volatile and/or non-volatile memory capable of storing information during and/or for the execution of instructions. The devices, systems, sources, units and/or components of the product delivery system 103 can be coupled to a network 127, e.g., the Internet, via one or more wired and/or wireless network links, and can be accessed by one or more network interfaces 114.

In one or more embodiments, the product delivery system 103 can interact with one or more users or clients 130 . . . 130N (and associated user/client computing devices 131 . . . 131N, e.g., a laptop, mobile phone, tablet, or desktop computer), one or more couriers 185, one or more financial institutions 175 (e.g. banks, bank branches, financial institutions, financial institution branches, and/or storage facilities associated therewith), one or more locations 170 (e.g. residence) associated with the one or more users and/or one or more facilities 180 (e.g. retail locations, shops, etc.) that are within a certain location to the one or more financial institutions 175, and/or share public utilities (roads, water, sewage, electric, and/or internet services) with the one or more financial institutions via a network interface 114 that can access the network 127. In various embodiments, the product delivery system 103 can interact with one or more data databases or data sources 120 also via the network interface accessing the network 127.

In various embodiments, the one or more data sources can include a location database 121A that can include static and dynamically updated location information associated with the one or more users 130 . . . 130N, the one or more couriers 185, the one or more facilities 180, the one or more financial institutions 175, and/or any public utilities associated therewith. In various embodiments, the one or more data sources 120 can include a traffic database 121B that can include static and dynamically updated information related to the amount of street traffic associated with transportation routes at the one or more facilities 180 and/or the one or more financial institutions 175. The database 121B can be updated and/or populated by satellite data, entry of information by staff members at either the one or more facilities 180 and/or the one or more financial institutions 175, surveillance equipment associated with the one or more facilities 180 and/or the one or more financial institutions, accessing information from internal databases (e.g. of the one or more facilities 180 and/or the financial institutions 175), and/or by accessing information from public records (and/or having staff members of public institutions enter the information as needed). In various embodiments, the one or more databases can include a utilities database 121B that can include static and dynamically updated data concerning the utilization of human, computer, internet, electric, water, or other resources by the financial institutions 175 (including use of those resources by employees and customers associated therewith)

and/or the facilities 180 (including use of those resources by employees and customers associated therewith). The information associated with the utilization can be inputted directly into the database 121B by staff members of the financial institutions 175 and/or facilities 180, staff members of public entities or other entities (e.g. internet service providers) that provide access to the utilities to the financial institutions 175 and/or facilities 180, and/or by using surveillance, meter, or other equipment that can automatically input data into database 121B, where the updating can be in coordination with other databases. For example, a surveillance camera of the financial institution or institutions 175 can detect that an individual is utilizing a computer and can identify that individual by coordinating with another database, such as a human resource database that can be part of the databases 121 (e.g. the additional information database 121N can include such employee identification information by way of non-limiting example). The databases 121 can further include a security database 121D that include generic security information and/or information about the security requirements associated with the delivery, transportation, dissemination, or receipt of sensitive products, items, or packages, including financial products (e.g. credit cards and/or debit cards), and individuals and/or entities that are qualified to handle those items, packages, or products. For example, a credit card and/or debit card may require an individual with a certain certification and/or a particular transportation and/or packaging requirement in order for the sensitive item, package, or product to be delivered or otherwise obtained by a user. This can include a list of couriers 185 or other financial institution 175 staff members qualifier to deliver a sensitive item, package, or product to a user and/or handle the sensitive item, package or product until a user retrieves it by physically arriving at the financial institution 175 or other suitable location. The databases 121 can further include any number of additional databases 121N with additional information suitable or helpful in carrying out any of the operations as discussed herein.

In various embodiments, the databases can cross-update using any suitable component of any suitable computer system, e.g. delivery suggestion component 113 (as discussed in greater detail below). For example, if the database 121B indicates that a certain computer of financial institution 175 is being used and the individual identified as using it is a person certified for the handling of sensitive items, packages or products then database 121C can be updated that one less security transportation or handling resource is available at the particular financial institution 175 for handling a particular sensitive product, item, or package.

In various embodiments, the product delivery system 103 can be a web-plugin configuration installed or otherwise configured to run directly on computing devices 131 . . . 131N.

In one or more embodiments, the memory 104 can include a delivery determination component 105 and an operating system 109, where the operating system 109 can be any suitable operating system compatible with system 100. In one or more embodiments, the delivery determination component 105 can further include a natural language processing component ("NLP") 106, a pre-processing component 107, a training component 108, and a delivery suggestion component 113. In one or more embodiments, the one or more components of the product delivery system 103, e.g. NLP 106, process generic natural language inputs from the one or more users 130 . . . 130N or the one or more couriers 185, and based on information associated with data sources or databases 120, provide information related to obtaining or delivering a sensitive item, product, or package, including i) which courier and/or which route the one or more couriers 185 should take to make the delivery, ii) what delivery location or pick-up location should be used with respect to the sensitive item, package, or product pick-up by the one or more user 130 . . . 130N and/or courier 185 and/or iii) a color-based map on an interface displaying options for a pick-up or deliver location for either the one or more couriers 185 and/or one or more users 130 . . . 130N.

In various embodiments, the training component 108 creates one or more rules 112A for determining and selecting an optimal pick-up location, delivery location, and/or map for either one or both the one or more couriers 185 and/or one or more users 130 . . . 130N. The rules 112A are based on performing a suitable weighting operation on one or more of: at least one of a) a distance of each of the plurality of delivery source locations (e.g. 175) to the user (e.g. 130), b) a plurality of detectable internet connections associated with a plurality of internal customers at each of the delivery source locations (e.g. 175), c) a detectable data bandwidth associated with a plurality of enterprise internet connections at each of the plurality of delivery source locations (e.g. 175), d) one or more data sources indicative of an amount of consumption of one or more utility types by each of the delivery source locations (e.g. 175), e) a plurality of staff transactions at each of the delivery source locations (e.g. 175), and f) a detectable street traffic associated with a plurality of external customers entering each of the plurality of delivery source locations (e.g. 175), g) a security measure (e.g. security compliance measure) associated with the handling, maintenance, delivery or transportation of the sensitive product, package, or package, e.g. a credit or debit card package, and/or h) availability in relation to demand of the sensitive financial services product, package, or item at one or more pick-up or delivery locations. In various embodiments, the rules 112A can be generated by applying differing weights to different factors. In various embodiments, the training component 108 can construct any suitable machine learning model 112B utilizing rules 112A, where in various embodiments, the machine learning model 112B can be continuously trained and updated based on information obtained from data sources 120. In various embodiments, the machine learning model 112B can be trained to require a certain threshold score for a particular factor after the weight associated with respect to that factor in relation to the data sources 120 is applied. For example, rules 112A may apply a weighted value of 0.25 out of a total of "1," where a score of 0.75 is distributed (equally or unequally) to all of the factors (e.g. when summed together) with respect to the security compliance factor "g." In various embodiments, the rules 112A may indicate that the factor increases in relative value based on a subset of factors, with each receiving a portion (equally or unequally) of the 0.25 distribution, e.g. the number of certified staffers at a pickup location (e.g. 175) that are certified to handle a sensitive financial services product, the presence or absence of a vault in the pickup location (e.g. 175), the proximity (e.g. proximity threshold) of one or more couriers 185 that is certified to transport a sensitive financial services product, the presence and/or operability of machinery available to prepare a financial services product (e.g., whether a bank branch has impression machinery available to produce a payment card), etc.

In various embodiments, the machine learning model 112B can process data from data sources 120 pursuant to this scheme, generate a score in relation to each factor (based on the weights and input data), generate an aggregate score based on the scores of each factor, and make a determination (based on an individual or aggregate score) on where the one or more users 130 ... 130N can pick up the sensitive financial services product, and/or where the financial services product can be manufactured, and/or where the one or more couriers 185 can pick up and deliver the financial services product, and/or an optimal route in relation to a pick-up or delivery location. In various embodiments, the machine learning model 112B can be configured to require a minimal threshold score for one or more of the factors in order for a recommendation as to a route and/or location is recommended to either the one or more users 130 ... 130N and/or the one or more couriers 185. For example, a minimum threshold score for the security compliance, e.g. at least one staff member at a bank 175 is certified to handle the sensitive financial services product and/or the one or more couriers 185 are certified to handle the sensitive financial services product.

In various embodiments, once trained, the delivery suggestion component 113 can utilize the one or more machine learning models 112B and/or any one or more of the individual factors and associated rules 112A to provide a recommendation to one or more users 130 ... 130N and/or one or more couriers 185 as to an optimal delivery location, pick-up location and/or delivery or pick-up route associated with a sensitive financial services product and/or to adjust an interface with respect to the sensitive financial services product (e.g. provide a color-scheme map with respect to picking up or delivering the sensitive financial services product). Similarly, the delivery suggestion component 13 may instruct the pick-up location to prepare the sensitive financial services product (e.g., cause impression machinery to prepare or otherwise produce a requested payment card).

In various embodiments, a display associated with either the one or more couriers 185 and/or the one or more users 130 ... 130N (e.g. the display of computer devices 131 ... 131N) can be configured by the delivery suggestion component 113 to provide a color-scheme map (e.g. generated color-map with respect to interface scheme 112C) associated with picking up or delivering a sensitive financial services product, package, or item (e.g. a debit card or a credit card). The color-scheme map can be configured based solely on the demand of one or more users 130 ... 130N to obtain a financial services product, package, or item in relation to availability at one or more locations, e.g. bank 175. The color-scheme can be any suitable scheme, including shades of green where availability is (or increases) high in relation to demand and shades or red when availability is (or decreases) low in relation to demand. In various embodiments, the color-scheme map can be, in lieu of demand in relation to availability, based on an individual score or aggregate score in relation to any other of the one or more factors processed and updated by the one or more machine learning model 112b, e.g. security, resources availability, distance from user to pick-up location, etc. In various embodiments, the color-scheme map can be based on any one or more of the one or more factors, including demand in relation to availability, based on an individual score or aggregate score in relation to any other of the one or more factors processed and updated by the one or more machine learning model 112b, e.g. security, resources availability, distance from user to pick-up location, etc.

In various embodiments, the delivery suggestion component 113 can provide a resource suggestion to any vendor, vendors or operation, e.g. 180 (and where, in various embodiments, the vendors can be distinct to the pick-up or delivery location or locations associated with the sensitive item, package, or product), located within a certain proximity, e.g. within a certain proximity threshold in relation to the street of the pick-up or delivery location, e.g. bank 175, based on assessed street traffic with respect to the pick-up or delivery location. For example, the delivery suggestion component 113 can provide a suggestion to one or more retailers 180 that an increase in internet or electricity use will likely occur based on associated street traffic and incoming customers with respect to the bank 175. In various embodiments, the delivery suggestion component 113 will provide the suggestion only if the delivery or pick-up location 175 is actually recommended as a pick-up and/or delivery location for the one or more users 130 ... 130N and/or one or more couriers 185 with respect to the sensitive financial services product, item, or package, and/or only if the delivery or pick-up location is actually used by the one or more users 130 ... 130N and/or one or more couriers 185 with respect to the sensitive financial services product, item, or package.

Figure 2:
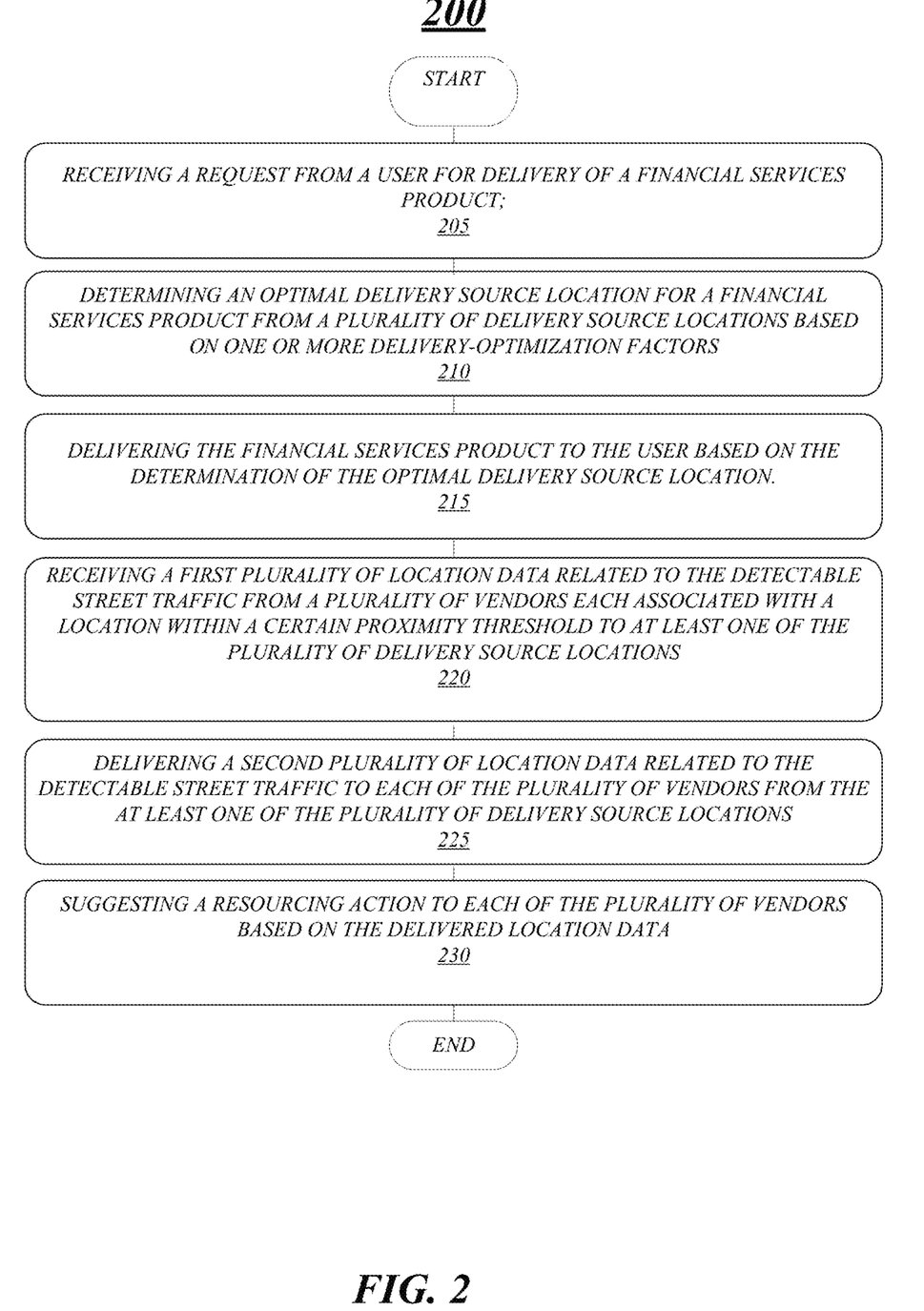
FIG. 2 illustrates examples of one or more processing flows for determining an optimal provision of a sensitive item or package to one or more users and in accordance at least one embodiment of the present disclosure.

FIG. 2 illustrates an example of a logic flow 200 that may be representative of some or all of the operations executed by one or more embodiments described herein. For example, the logic flow 200 may illustrate operations performed by the system 100 or any other suitable product delivery recommendation system.

At block 205, one or more embodiments may include receiving a request from a user for delivery of a financial services product. The request may be received at any suitable computer device associated with the user, and the financial services product can be a debit or credit card. At block 210, one or more embodiments may include determining an optimal pick-up location (e.g. where the user can pick-up the sensitive product, item or package), a courier for delivering and picking up the sensitive financial services product, item, or package, a location for preparing the sensitive financial services product, and/or a route in relation for delivering and/or picking up the sensitive financial services product, item or package. The determination can be based on one or more factors, including but not limited to a) a distance of each of the plurality of delivery source locations to the user, b) a plurality of detectable internet connections associated with a plurality of internal customers at each of the delivery source locations, c) a detectable data bandwidth associated with a plurality of enterprise internet connections at each of the plurality of delivery source locations, d) one or more data sources indicative of an amount of consumption of one or more utility types by each of the delivery source locations, e) a plurality of staff transactions at each of the delivery source locations, f) a detectable street traffic associated with a plurality of external customers entering each of the plurality of delivery source locations, g) a security compliance measure associated with the handling, maintenance, delivery or transportation of the sensitive product, package, or package, e.g. a credit or debit card package, and/or h) availability in relation to demand of the sensitive financial services product, package, or item at one or more pick-up or delivery locations. Once determined, the system 103 may instruct a selected pickup location to prepare an item (e.g. a payment card) according to one more criteria or rules (e.g., a time by which the item is to be prepared, one or more rules for handling the item, etc.), instruct a selected courier to pick up the item from the pickup location and deliver the item to a delivery address according to one or more rules (e.g., a time to pick up the item, a time to deliver the item, rules for handling the item, etc.), and notify the requesting user of the selected courier, a delivery time, and any other information related to the order.

In various embodiments, a threshold determination can be made with respect to one or more factors in order to provide the recommendation. In various embodiments, the determination is based on one or more rules utilizing the factors, weights associated with the factors (e.g. based on sub-factors or any other weight distribution mechanism), and scores based on data imputed in relation to the weights and factors. In various embodiments, the determination can be based on an aggregated score based on the weights in relation to the factors (and inputted data), an individual score based on a weight related to a single factor, and/or any suitable combination, including at least one embodiment where a minimal threshold score is required for at least one factor, e.g. security, with an aggregate overall score still forming the basis for the determination once the threshold is met with respect to a particular location and/or route in relation to the sensitive financial services product, package or item. In various embodiments, at block 215, the financial services product is delivered to the user based on the determination of the optimal delivery location and/or the user picks up the financial services product at a pick-up location based on the determination.

At block 220, one or more embodiments includes receiving location data related to the detectable street traffic from a plurality of vendors each associated with a location within a certain proximity threshold to at least one of the one or more potential of delivery or pick-up locations. The data can be received from any vendor that is within a certain threshold distance with respect to a pick-up or delivery location that is in turn within a certain threshold distance to the user and has been logged in a suitable database as having, at one point in time, had possession of a suitable financial services product, item, or package. In various embodiments, the data can be received only by a delivery or pick-up location that meets a certain aggregate score and/or individual score threshold as outlined above.

At block 225, a suitable or multiple suitable pick-up or delivery locations based on block 220 transmit or deliver a second location related to street traffic to one or more vendors associated with the suitable and/or multiple suitable pick-up or delivery locations, e.g. within a certain distance in relation thereto. At block 230, a suggestion is made for a resourcing action, e.g. an indication that a certain amount of electricity, water, staffing or internet resources will be consumed or require adjustment based on the street traffic associated with the second location data. In various embodiments, the second location data will only be transmitted by a pick-up or delivery location that is determined suitable for a delivery or pick-up of a financial services product, item or package to one or more users, where in various embodiments, the second location data will only be transmitted if the pick-up or delivery location is actually used by a user or courier in relation to obtaining or delivering the sensitive financial services item, package, or product.

FIG. 3 illustrates an example of a logic flow 300 that may be representative of some or all of the operations executed by one or more embodiments described herein. For example, the logic flow 300 may illustrate operations performed by the system 100 or any other suitable product delivery recommendation system. In various embodiments, blocks 305, 310, and 315 are substantially similar in operability to blocks 205, 210, and 215 from flow 200.

The flow can include block 320, which can involve generation of a color-map that displays a demand for at least one financial services product type, corresponding to the financial services product requested by the user, at each of the plurality of delivery sources. In addition to demand in relation to availability and/or in lieu thereof, any other suitable factor or factors and/or associated with rules, weights, scores and/or machine learning techniques can be used to generate the color-scheme. The color-scheme can be used by either the user or a courier to make the deliver associated with block 315 and/or a subsequent pick-up and/or delivery for the same user, another user and/or by the same courier and/or another courier.

Figure 4:
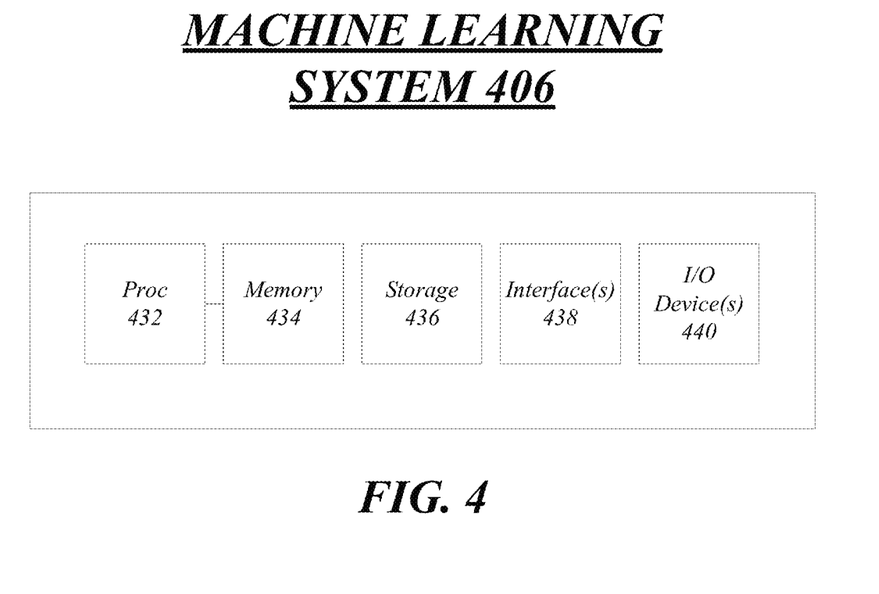
FIG. 4 illustrates a machine learning system according to an embodiment of the present disclosure

FIG. 4 illustrates an example of a machine learning transaction services system 406. The system 406 includes one or more processor(s) 432, memory 434, storage 436, one or more interface(s) 438, and one or more I/O device(s) 440.

In embodiments, the system 406 may be a processing system that includes one or more servers or computing devices that are interconnected via one or more network links, e.g., wired, wireless, fiber, etc. In some instances, the transaction services system may be a distributed computing system. Each of the servers may include one or more processor(s) 432, which may include one or more processing cores to process information and data. Moreover, the one or more processors 432 can include one or more processing devices, such as a microprocessor manufactured by Intel™, AMD™, or any of various processors. The disclosed embodiments are not limited to any type of processor(s).

Memory 434 can include one or more memory (volatile or non-volatile) devices configured to store instructions used by the one or more processors 432 to perform one or more operations consistent with the disclosed embodiments. For example, memory 434 can be configured with one or more software instructions, such as programs that can perform one or more operations when executed by the one or more processors 432.

The disclosed embodiments are not limited to separate programs or computers configured to perform dedicated tasks. For example, memory 434 can include a single program that performs the operations or could comprise multiple programs. Memory 434 can also store data that can reflect any type of information in any format that the system can use to perform operations consistent with the disclosed embodiments.

In embodiments, the transaction services system 406 may include one or more storage devices 436. The storage devices 436 may include HDDs, flash memory devices, optical storage devices, floppy storage devices, etc. In some instances, the storage devices 456 may include cloud-based storage devices that may be accessed via a network interface. In some embodiments, the storage 436 may be configured to store one or more databases and/or as a distributed database system to store information and data. Databases can include one or more memory devices that store information and are accessed and/or managed through the transaction services system 406. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 406 can include databases located remotely from other transaction services system 406 devices. The databases can include computing components (e.g., database management system, database server, etc.) configured to receive and process requests for data stored in memory devices of databases and to provide data from databases.

Figure 5:
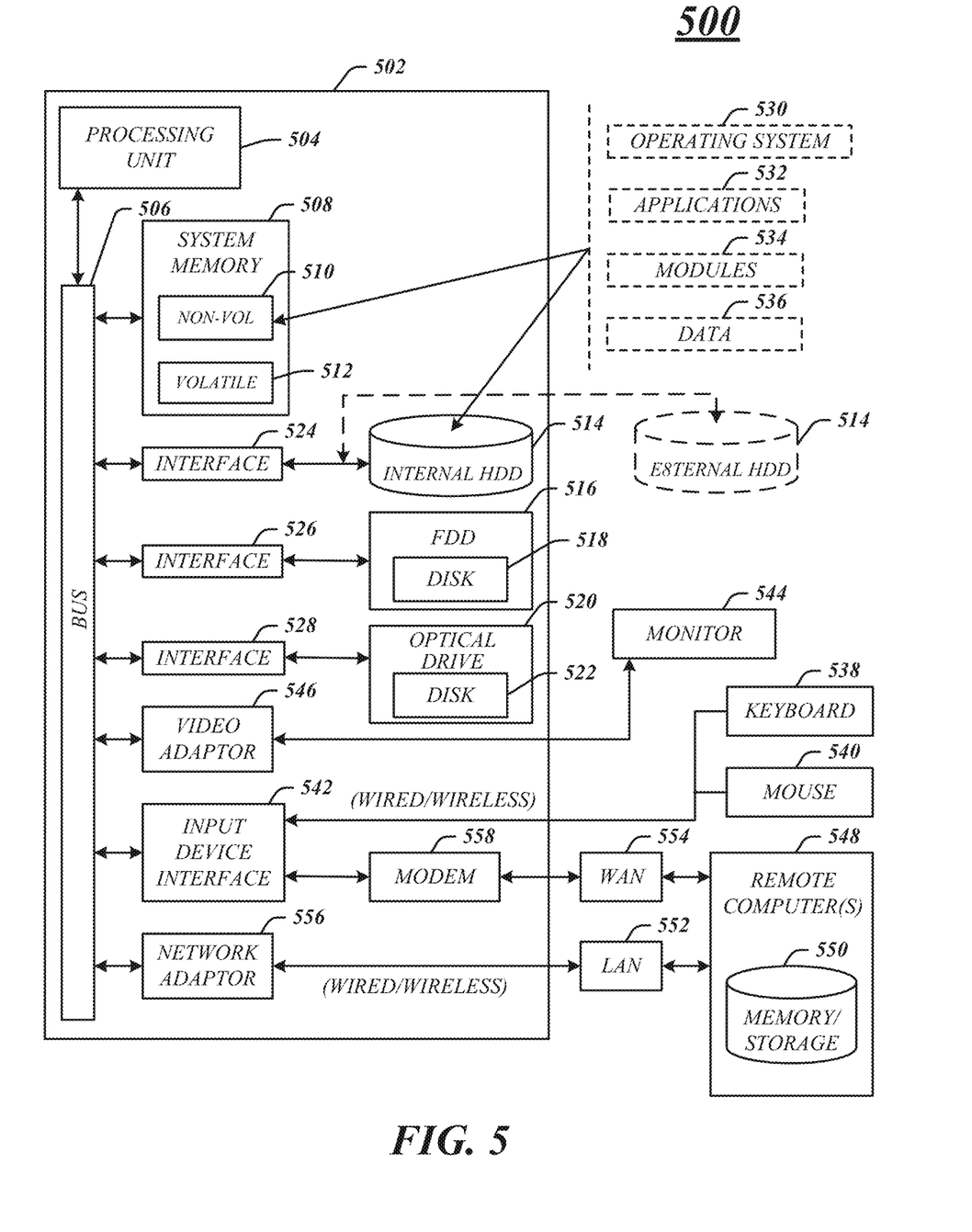
FIG. 5 illustrates an embodiment of a computing architecture useful with at least one embodiment of the present disclosure.

FIG. 5 illustrates an embodiment of an exemplary computing architecture 500 suitable for implementing various embodiments as previously described. In one embodiment, the computing architecture 500 may include or be implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 600.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
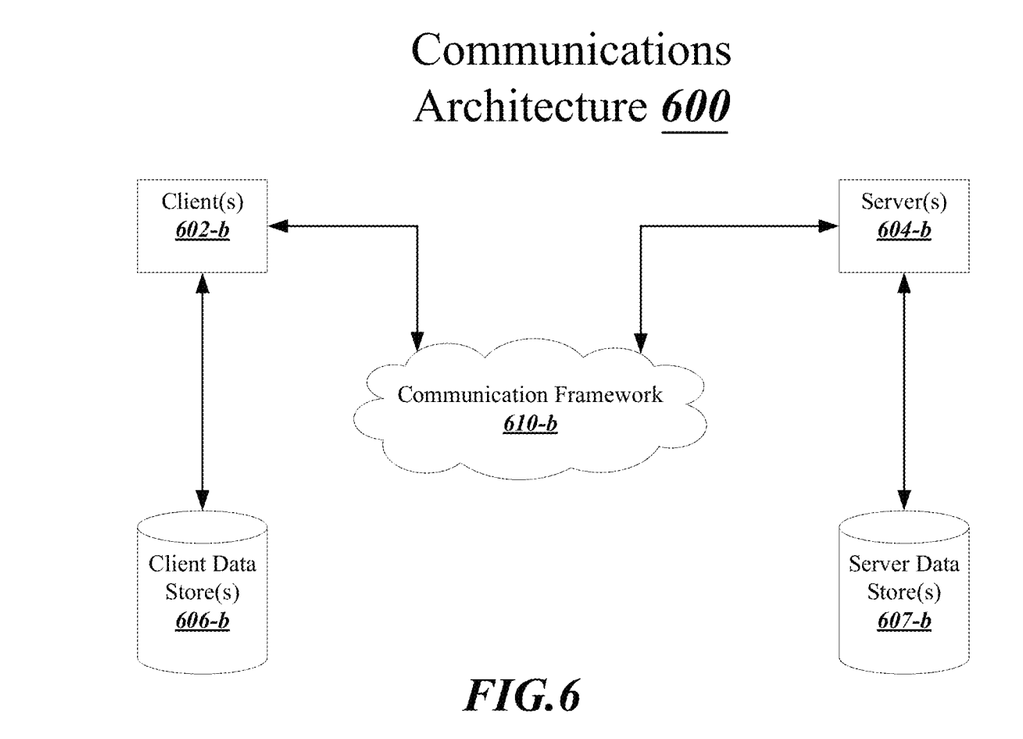
FIG. 6 illustrates an embodiment of a communications architecture useful with at least one embodiment of the present disclosure.

FIG. 6 is a block diagram depicting an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600, which may be consistent with system 100.

As shown in FIG. 6, the communications architecture 600 includes one or more clients 602 and servers 604. The servers 604 may implement the system 406. The clients 602 and the servers 604 are operatively connected to one or more respective client data stores 606 and server data stores 607 that can be employed to store information local to the respective clients 602 and servers 604, such as cookies and/or associated contextual information.

The clients 602 and the servers 604 may communicate information between each other using a communication framework 610. The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
receiving, via a computer network, a natural language request for delivery of a payment card to a delivery address, wherein the payment card is to be delivered from one of a plurality of delivery source locations;
executing a machine learning (ML) model trained based on a plurality of rules and training data, the ML model trained to determine a respective weight for each of a plurality of factors based on the plurality of rules, the plurality of factors comprising: a) a distance of each of the plurality of delivery source locations to a plurality of addresses, b) a plurality of detectable internet connections associated with a plurality of internal customers at each of the delivery source locations, c) a detectable data bandwidth associated with a plurality of enterprise internet connections at each of the plurality of delivery source locations, d) an amount of consumption of one or more utility types by each of the delivery source locations, e) a plurality of staff transactions at each of the delivery source locations, and f) a detectable street traffic associated with a plurality of external customers entering each of the plurality of delivery source locations;

determining a subset of the plurality of delivery source locations that are within a threshold distance of the delivery address;

selecting, via execution of the ML model, a first delivery source location for the payment card from the subset of the plurality of delivery source locations based on:
  i) computing a threshold score for each of the plurality of delivery source locations, wherein the threshold score is related to a security compliance measure associated with the payment card, and
  ii) computing an aggregated score for each of the delivery source locations in the subset, the aggregated scores based on the respective weights of each of the plurality of factors applied to a) a respective distance of each delivery source location of the subset to the delivery address, b) the plurality of detectable internet connections associated with the plurality of internal customers at each delivery source location of the subset, c) the detectable data bandwidth associated with the plurality of enterprise internet connections the delivery source location of the subset, d) the amount of consumption of one or more utility types by the delivery source location of the subset, e) the plurality of staff transactions at the delivery source location of the subset, and f) the detectable street traffic associated with the plurality of external customers entering the delivery source location of the subset;

instructing, via the network, impression machinery at the first delivery source location to manufacture the payment card; and instructing, via the network, a courier service to deliver the payment card to the delivery address based on the selection of the first delivery source location and the plurality of rules, wherein the ML model is continuously trained using traffic training data comprising dynamically updated street traffic information of transportation routes associated with the plurality of delivery source locations, at least a portion of the traffic training data obtained via one of satellite data or surveillance equipment associated with the plurality of delivery source locations.

2. The method of claim 1, the method further comprising:
generating a color-map displaying a demand for at least one payment card type in relation to a supply of the at least one payment card type, the payment card type corresponding to the payment card, at each of the plurality of delivery source locations, and wherein the first delivery source location is further determined based on the generated color-map.

3. The method of claim 1, wherein each of the plurality of delivery source locations is a bank branch.

4. The method of claim 1, the method further comprising:
generating a color-map displaying a demand for at least one payment card type, corresponding to the payment card, at each of the plurality of delivery source locations.

5. The method of claim 1, wherein the first delivery source location is determined based on the detectable street traffic, and the method further comprising:
receiving a first plurality of location data related to the detectable street traffic from a plurality of vendors each associated with a location within a certain proximity threshold to at least one of the plurality of delivery source locations.

6. The method of claim 5, wherein each of the plurality of vendors is a distinct type of vendor in relation to each of the plurality of the delivery source locations.

7. The method of claim 6, the method further comprising:
delivering a second plurality of location data related to the detectable street traffic to each of the plurality of vendors from the at least one of the plurality of delivery source locations; and
suggesting a resourcing action to each of the plurality of vendors based on the delivered location data.

8. An apparatus, comprising:
a memory to store instructions; and
processing circuitry, coupled with the memory, operable to execute the instructions, that when executed, cause the processing circuitry to:
  receive, via a network, a natural language request for delivery of a payment card to a delivery address, wherein the payment card is to be delivered from one of a plurality of delivery source locations;
  execute a machine learning (ML) model trained based on a plurality of rules and training data, the ML model trained to determine a respective weight for one or more of a plurality of factors based on the plurality of rules, the plurality of factors comprising two or more of: a) a distance of each of the plurality of delivery source locations to a plurality of addresses, b) a plurality of detectable internet connections associated with a plurality of internal customers at each of the delivery source locations, c) a detectable data bandwidth associated with a plurality of enterprise internet connections at each of the plurality of delivery source locations, d) an amount of consumption of one or more utility types by each of the delivery source locations, e) a plurality of staff transactions at each of the delivery source locations, and f) a detectable street traffic associated with a plurality of external customers entering each of the plurality of delivery source locations;
  determine, by the ML model, a first delivery source location for the payment card from the plurality of delivery source locations based on:
    i) a threshold score computed for each of the plurality of delivery source locations, wherein the threshold score is related to a security compliance measure associated with the payment card, and
    ii) an aggregated score computed for each of the delivery source locations in the subset, the aggregated scores based on the respective weights of each of the plurality of factors applied to two or more of a) a respective distance of each delivery source location of the subset to the delivery address, b) the plurality of detectable internet connections associated with the plurality of internal customers at each delivery source location of the subset, c) the detectable data bandwidth associated with the plurality of enterprise internet connections the delivery source location of the subset, d) the amount of consumption of one or more utility types by the delivery sources location of the subset, e) the plurality of staff transactions at the delivery source location of the subset, and f) the detectable street traffic associated with the plurality of external customers entering the delivery source location of the subset; and instruct, via a network, a courier service to deliver the payment card to be delivered to the delivery address based on the determination of the first delivery source location and the plurality of rules, wherein the ML model is continuously trained using traffic training data comprising dynamically updated street traffic information of transportation routes associated with the plurality of delivery source locations, at least a portion of the traffic training data obtained via one of satellite data or surveillance equipment associated with the plurality of delivery source locations.

9. The apparatus of claim 8, wherein the process circuitry is further caused to:

generate a color-map displaying a demand for at least one payment card type in relation to a supply of the at least one payment card type, the payment card type corresponding to the payment card, at each of the plurality of delivery source locations, and wherein the first delivery source location is further determined based on the generated color-map.

10. The apparatus of claim 9, wherein each of the plurality of delivery source locations is a bank branch, and wherein the threshold score corresponds to the one or more security measures associated with transporting the payment card.

11. The apparatus of claim 9, wherein the process circuitry is further caused to:

receive a first plurality of location data related to the detectable street traffic from a plurality of vendors each associated with a location within a certain proximity threshold to at least one of the plurality of delivery source locations.

12. The method of claim 1, further comprising:

determining another delivery source location is added to the plurality of delivery source locations; and retraining the ML model based at least in part on the addition of the another delivery source location to the plurality of delivery source locations.

13. The method of claim 12, further comprising:

receiving a second natural language request for delivery of a second payment card to a delivery address;

selecting, by the retrained ML model, the another delivery source location based on the threshold score for the another delivery source location and the aggregated score for the another delivery source location; and delivering the second payment card to the delivery address based on the selection of the another delivery source location.

14. The method of claim 13, further comprising:

instructing impression machinery at the another delivery source location to generate the second payment card.

15. The method of claim 1, wherein the ML model is continuously trained using utilities training data comprising dynamically updated resource utilization information of the plurality of delivery source locations, at least a portion of the utilities training data obtained via one of a resource meter or surveillance equipment associated with the plurality of delivery source locations.

16. The method of claim 15, wherein the surveillance equipment comprises a surveillance camera configured to detect an individual utilizing a computer, wherein the individual is identified via coordinating with a human resources database comprising employee identification information.

17. The method of claim 1, wherein the ML model is trained to require a minimum value for the threshold score for the security compliance measure in order to select one of the plurality of delivery source locations as the first delivery source location, the minimum value configured to indicate that a resource at the plurality of delivery source locations is certified to handle the payment card.

18. A non-transitory computer-readable storage medium storing computer-readable program code executable by a processor to:

execute a training component to:

construct a machine learning (ML) model configured to select an optimal source location from a plurality of source locations for providing a payment card, the ML model constructed using a plurality of rules based on weighting operations on a plurality of selection factors, the plurality of selection factors comprising two or more of distance, resource utilization, detectable street traffic, and security compliance measures, the ML model constructed to:

receive input data associated with the plurality of selection factors, generate an individual score for each of the plurality of selection factors, the individual score determined based on a respective weight for each of the plurality of selection factors specified by the plurality of rules, generate an aggregate score of the individual score of each of the plurality of selection factors, and generate output of the optimal source location based on the aggregate score, and train the ML model using training data, the training data comprising at least one of:

traffic training data comprising dynamically updated street traffic information of transportation routes associated with the plurality of source locations, at least a portion of the traffic training data obtained via one of satellite data or surveillance equipment associated with the plurality of source locations, or utilities training data comprising dynamically updated resource utilization information of the plurality of source locations, at least a portion of the utilities training data obtained via one of a resource meter or surveillance equipment associated with the plurality of source locations.

19. The non-transitory computer-readable storage medium of claim 18, wherein the ML model is trained to require a minimum value for a threshold score for the security compliance measures in order to select one of the plurality of source locations as the optimal source location, the minimum value configured to indicate that a resource at the plurality of source locations is certified to handle the payment card.

20. The non-transitory computer-readable storage medium of claim 18, wherein the surveillance equipment comprises a surveillance camera configured to detect an individual utilizing a computer, wherein the individual is identified via coordinating with a human resources database comprising employee identification information.

* * * * *